United States Patent [19]
Skarbo et al.

[11] 3,988,151
[45] Oct. 26, 1976

[54] LIQUID ION EXCHANGE PROCESS FOR THE RECOVERY OF COPPER AND NICKEL

[75] Inventors: Roald R. Skarbo, Lokken Verk, Norway; David L. Natwig, Brighton, Mass.

[73] Assignee: Kennecott Copper Corporation, New York, N.Y.

[22] Filed: June 16, 1975

[21] Appl. No.: 587,106

Related U.S. Application Data

[63] Continuation-in-part of Ser. No. 380,792, July 19, 1973, Pat. No. 3,907,966.

[52] U.S. Cl. .............................. 75/119; 75/101 BE; 204/108; 423/24; 423/139
[51] Int. Cl.[2] .................. C01G 3/00; C01G 51/00; C01G 53/00
[58] Field of Search .................. 423/24, 139, 658.5; 75/101 BE, 119; 204/108

[56] References Cited
UNITED STATES PATENTS

| | | | |
|---|---|---|---|
| 3,276,863 | 10/1966 | Drobnick et al. | 423/139 |
| 3,761,249 | 9/1973 | Ritcey et al. | 75/101 BE |
| 3,794,719 | 2/1974 | Lowenhaupt et al. | 423/139 |
| 3,853,725 | 12/1974 | Skarbo | 423/139 |
| 3,855,090 | 12/1974 | Skarbo | 423/24 |
| 3,907,966 | 9/1975 | Skarbo | 423/139 |

OTHER PUBLICATIONS
Evans et al., Editors, *International Symposium on Hydrometallurgy*, A.I.M.E., New York 1973, pp. 552-588.

*Primary Examiner*—Oscar R. Vertiz
*Assistant Examiner*—Brian E. Hearn
*Attorney, Agent, or Firm*—John L. Sniado; Lowell H. McCarter; Anthony M. Lorusso

[57] ABSTRACT

Ammoniacal leach solutions containing nickel and copper (and possibly other base metal values) are treated by first extracting copper leaving nickel in the raffinate. The nickel in the raffinate is subsequently extracted with an organic extractant. The nickel loaded organic extractant is subsequently stripped with a highly concentrated ammonium salt solution to yield a strip concentrate from which nickel or nickel oxide is recoverable without electrolytic treatment. To prevent build up of copper in the nickel extraction circuit, part or all of the organic from the nickel strip circuit is recycled back to the copper extraction circuit where copper on the organic is eventually stripped. In the copper extraction circuit, the nickel on the recycled organic is replaced by copper from the aqueous, preventing build up of nickel on the organic leaving the copper extraction circuit.

10 Claims, 5 Drawing Figures

LIQUID ION EXCHANGE PROCESS FOR THE RECOVERY OF COPPER AND NICKEL

CROSS REFERENCE TO A RELATED APPLICATION

This application is a continuation-in-part of application Ser. No. 380,792 entitled Nickel Recovery, filed on July 19, 1973 now U.S. Pat. No. 3,907,966, the teachings of which are incorporated herein by reference.

BACKGROUND OF THE INVENTION

In co-pending parent patent application Ser. No. 380,792 (now U.S. Pat. No. 3,907,966) entitled Nickel Recovery, a process for recovering nickel from ammoniacal leach solutions containing nickel, copper and other metal values is disclosed. In that process, metal values such as copper are first extracted leaving a raffinate containing nickel. The nickel in the raffinate is then extracted with an organic extractant such as an oxime. After leaving the nickel extraction circuit, the nickel on the nickel loaded extractant is stripped with a highly concentrated ammonium salt solution to yield a strip concentrate from which nickel or nickel oxide is recoverable without electrolytic treatment.

Although essentially all of the copper is extracted in the copper extraction circuit, a small amount of copper, i.e. approximately 0.05 grams per liter remains with the nickel in the raffinate leaving the copper extraction circuit. This trace amount of copper in the raffinate entering the nickel extraction circuit builds up on the organic used to extract nickel in the nickel extraction circuit to a level where a small amount of copper is stripped in the nickel stripping circuit along with the nickel. Indeed, when the process reaches steady state, copper builds up in the organic to a level where an amount of copper is stripped in the nickel stripping circuit that is equal to the amount of copper that is extracted in the nickel extraction circuit. Of course, the copper that is stripped in the nickel stripping circuit remains with the nickel as a nickel product contaminant.

Another disadvantage of having copper loaded on the organic that is used to extract nickel in the nickel extraction circuit is that the presence of copper on the organic adversely effects the nickel extraction efficiency as well as the nickel loading capacity of the organic.

SUMMARY OF THE INVENTION

In accordance with the present invention, the build up of copper on the organic used to extract nickel in a nickel extraction circuit is prevented by recycling at least part of the organic leaving the nickel stripping circuit back to the copper extraction circuit. The reason why such a recycle is feasible is that essentially all of the nickel on the organic entering the copper extraction circuit is replaced by copper from the aqueous according to the following reaction:

$$R_2Ni_{(o)} + Cu^{++}_{(a)} \longrightarrow R_2Cu_{(o)} + Ni^{++}_{(a)}$$

By recycling at least a portion of the organic leaving the nickel stripping circuit to the copper extraction circuit, copper does not build up on the organic entering the nickel stripping circuit to a level where it would be stripped because the organic leaving the nickel stripping circuit is continuously recycled back to copper extraction circuit and subsequently stripped of copper in the copper stripping circuit prior to re-entering the nickel extraction circuit.

In one important embodiment of the present invention, the process step which accomplishes the foregoing recycle is mixing the organic from the copper stripping circuit and the organic from the nickel stripping circuit in a mixing tank. The mixed organic in the mixing tank is then fed into both the copper extraction circuit and the nickel extraction circuit as recycled organic. In another embodiment of the invention, the organic leaving the nickel stripping circuit is recycled to the copper extraction circuit and, after being stripped of copper, the organic is recycled to the nickel extraction circuit.

Accordingly, an object of the present invention is to provide an improved process for the separation and recovery of nickel from ammoniacal leach liquors containing nickel and other metals such as copper.

It is a further object of the present invention to provide an improved process for recovering and separating nickel from leach liquors containing nickel and other metal values which avoids the electrowinning of nickel.

It is a further object of the present invention to provide an improved method for preventing the build up of copper on the organic leaving a nickel extraction circuit in a process for separating copper and nickel from a leach solution which includes extracting the nickel and subsequently stripping the nickel loaded organic with a highly concentrated ammonium salt solution to yield a strip concentrate from which nickel or nickel oxide is recoverable without electrolytic treatment.

A further object of the present invention is to provide an improved process for recovering and separating nickel from a leach solution containing nickel and copper in which copper is first extracted, followed by nickel extraction, without the build up of copper on the organic entering the nickel stripping circuit.

A further object of the present invention is to provide a process for separating nickel from a leach solution containing copper and nickel in which copper is first extracted and nickel is subsequently extracted, with at least a portion of the organic from the nickel strip circuit being recycled back to the copper extraction circuit.

DESCRIPTION OF THE PREFERRED EMBODIMENTS

Figure 1:
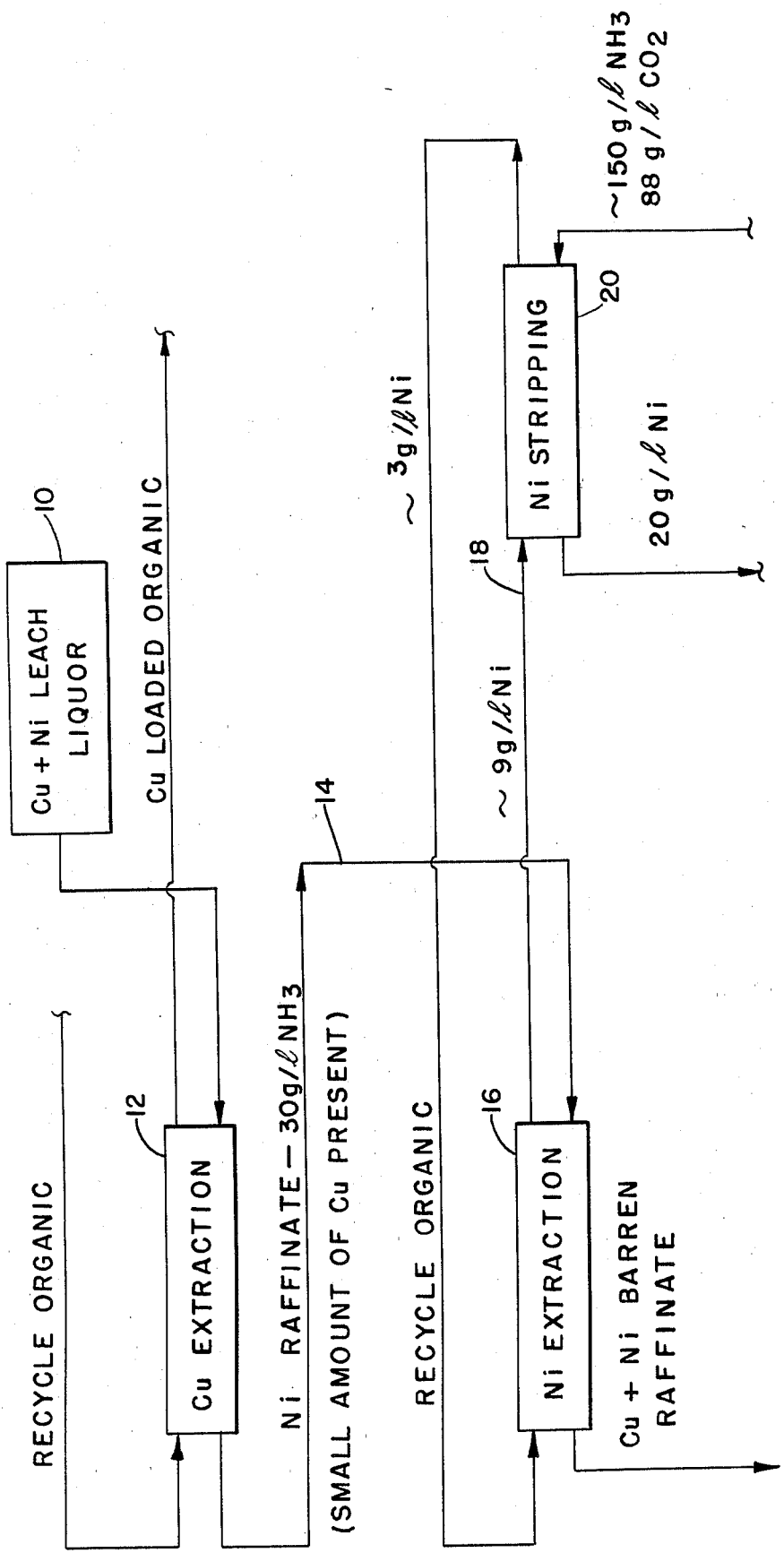
FIG. 1 is a condensed flow sheet of a process of the type claimed in parent U.S. Pat. No. 3,907,966.
Figure 2:
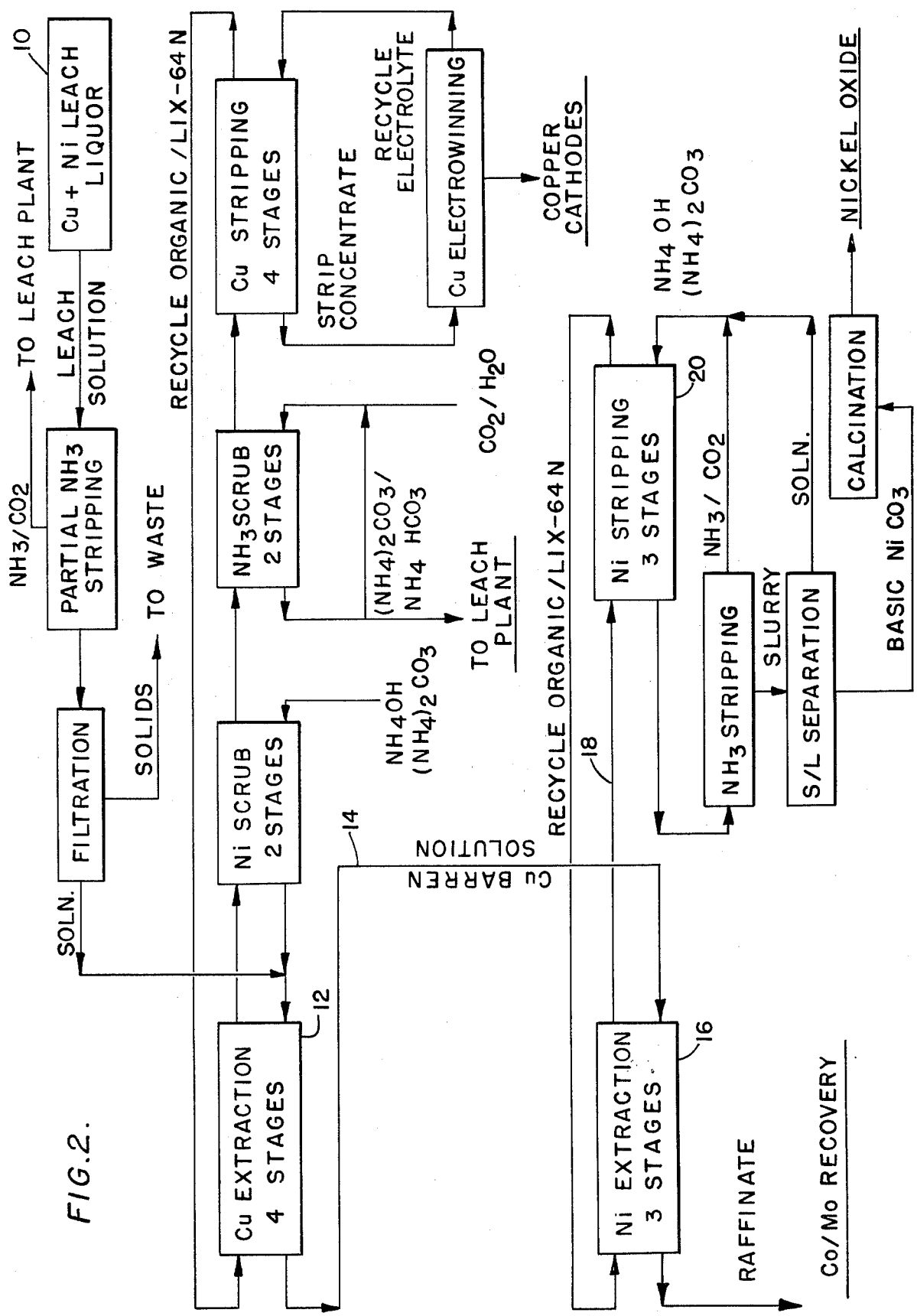
FIG. 2 is a more detailed flow sheet of the process shown in FIG. 1.

In order to appreciate the importance of the organic recycle step of the present invention, a description of a process without the recycle step of the present invention is described first. Referring to FIG. 1, a process without such a recycle is shown in its broadest overall aspects; while, FIG. 2 is a more detailed flow sheet of the process shown in FIG. 1. With extraction processes of the type shown in FIGS. 1 and 2, an ammoniacal leach liquor 10 containing copper and nickel values and having an initial pH of 10 or greater is treated in stage 12 to extract copper therefrom.

There are two principal methods by which copper can be extracted in stage 12 to leave a raffinate containing nickel. One method is to lower the pH of the leach liquor to a value of about 6, at which pH copper is extracted by an oxime to the exclusion of nickel. An example of such process is set forth in U.S. Pat. No. 3,761,249 by Ritcey et al entitled "Copper Extraction from Ammoniacal Solutions," the teachings of which are incorporated herein by reference.

Another method for extracting copper to the exclusion of nickel is to follow the teachings set forth in U.S. Pat. application Ser. No. 266,986, filed June 28, 1972, entitled "Selective Solvent Extraction Process," the teachings of which are incorporated herein by reference. Briefly, that application discloses a process for selectively extracting copper from an aqueous ammoniacal solution containing copper and nickel and having a pH above about 9, without lowering the pH, which comprises contacting the aqueous solution with a water immiscible organic oxime extractant in a plurality of extraction stages to effect copper ion transfer from the aqueous solution to the oxime extractant and hydrogen ion transfer from the oxime extractant to the aqueous solution in accordance with the equation:

where R is the organic moiety of the oxime. In this process, the aqueous solution and organic extractant are flowed countercurrently between stages with the mole ratio of exchangeable hydrogen ion in the oxime extractant prior to contact with the aqueous solution, to copper ion in the aqueous solution, prior to contact with the oxime extractant, being maintained between about 1.8 to 2.4.

Once the copper values are extracted, the raffinate 14 is delivered to nickel extraction stage 16 where the aqueous ammoniacal leach liquor containing nickel metal values is contacted with an organic extractant such as an oxime to extract nickel values therefrom. The nickel loaded organic extractant represented by stream 18 is then flowed into a nickel stripping circuit 20. In the nickel stripping circuit 20, the nickel loaded organic is contaced with a highly ammoniacal solution, preferably including ammonium carbonate. At this point it should be noted that it is preferred to strip the nickel from the organic in stage 20 with a highly ammoniacal solution as is taught in parent U.S. Pat. No. 3,909,966. However, the nickel on the oxime may also be stripped with a dilute mineral acid in stage 20. This fact is well known in this art and does not constitute part of this invention.

A major disadvantage of the process shown in FIGS. 1 and 2 is that any copper present in the nickel raffinate 14 can be extracted in nickel extraction stage 16 and ultimately stripped in nickel stripping stage 20 to constitute a contaminant for the nickel product. In accordance with the present invention, the build up of copper on the organic entering the nickel stripping circuit is prevented by recycling at least a portion of the organic from the nickel stripping circuit to the copper extraction circuit. Such a recycle may be accomplished in several ways, two of which are shown schematically in FIGS. 3–5.

Figure 3:
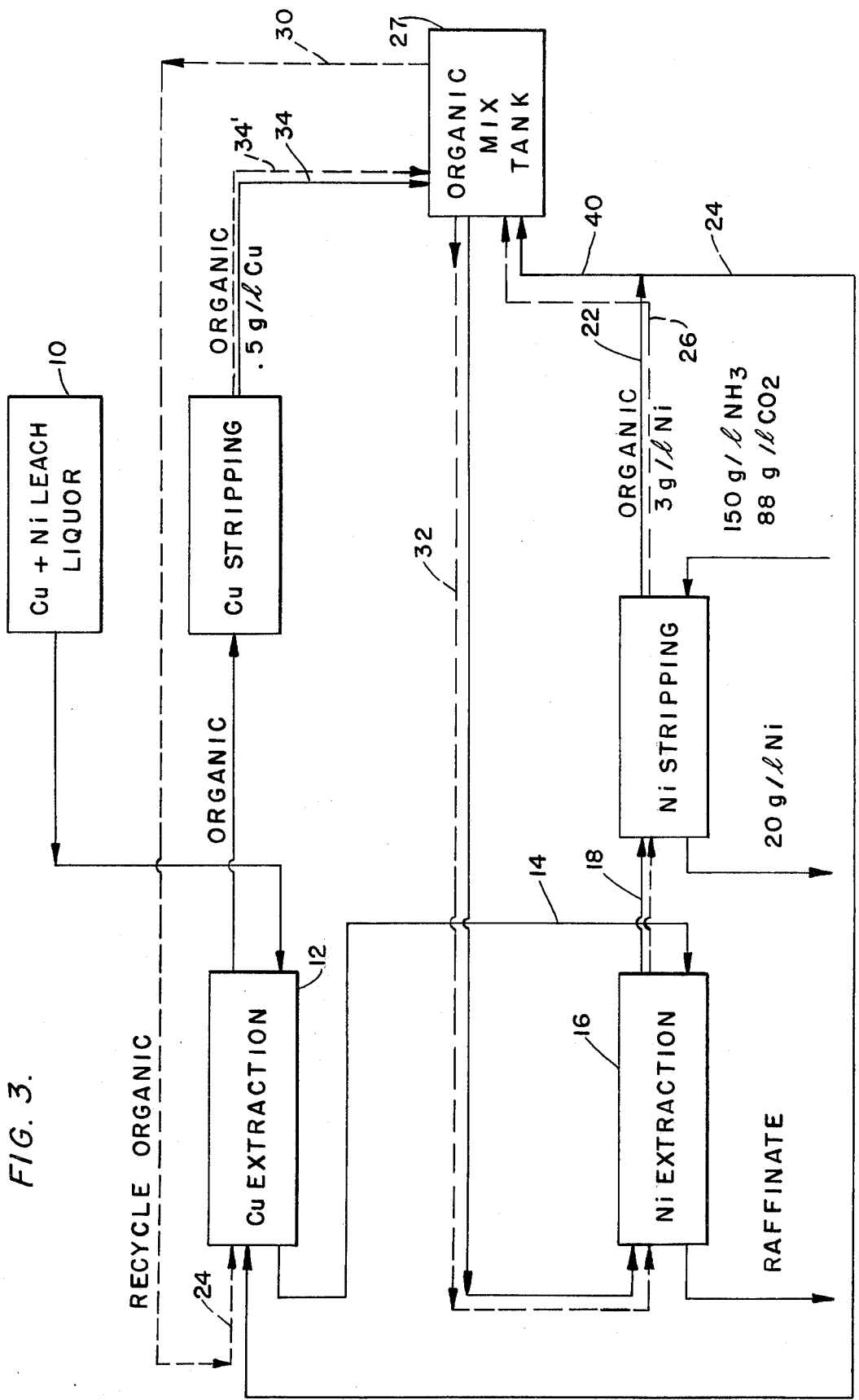
FIG. 3 is a condensed flow sheet of two alternate embodiments of the process of the present invention.
Figure 5:
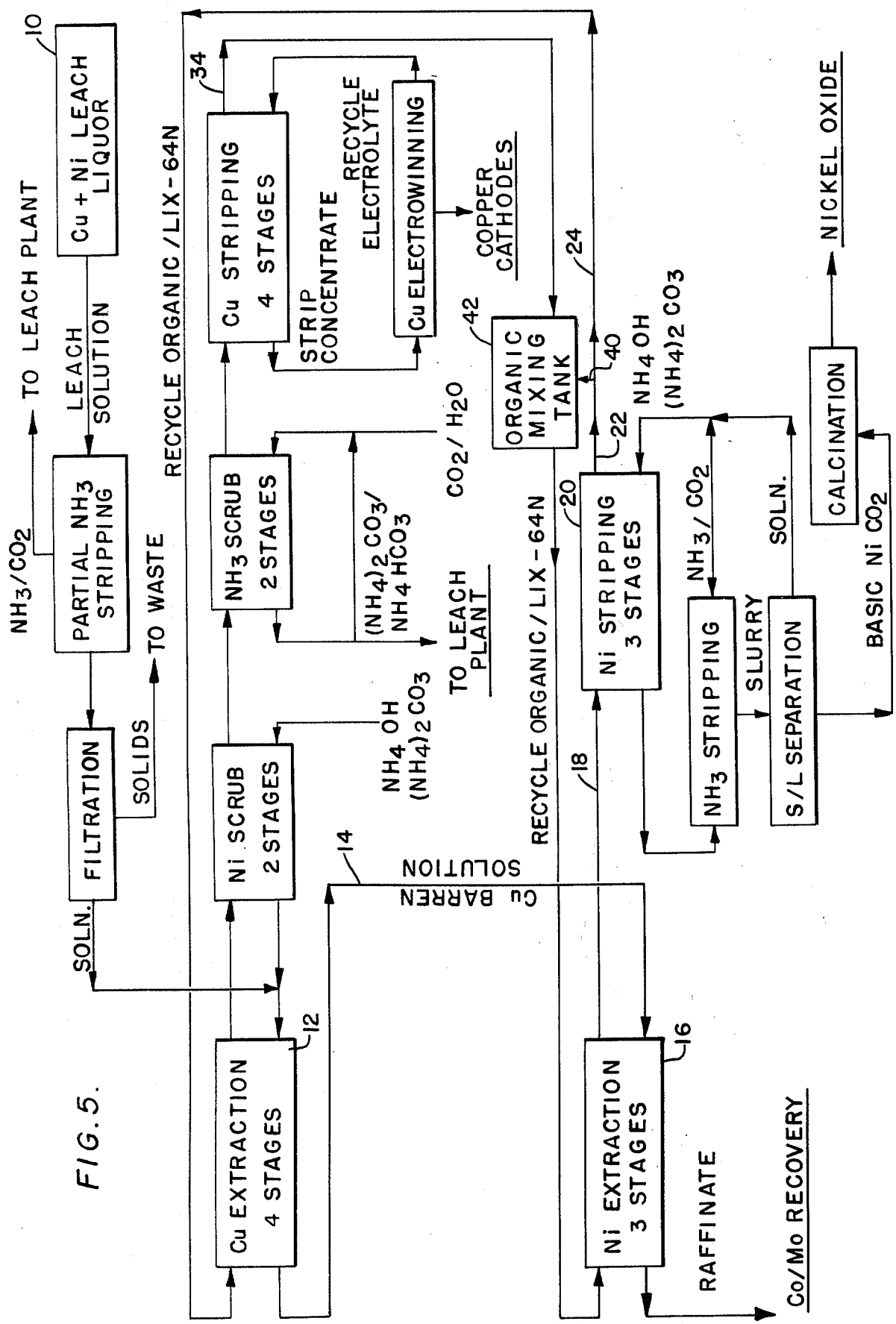

In one embodiment of the invention as is shown in FIG. 5 and by the solid lines in FIG. 3, part or all of the organic stream 22 leaving the nickel stripping circuit is recycled directly to the copper extraction circuit as recycle stream 24. As is also shown in FIGS. 3 and 5, part of stream 22 may be sent to a mix tank 27 as is shown by arrow 40 while the remainder of stream 22 is sent to copper extraction stage 12 as stream 24.

At this point it should be noted that in those rare cases where the organic feed rate to copper extraction stage 12 is equal to the organic feed rate to nickel extraction stage 16, then all the organic stream 22 from the nickel stripping stage may be sent directly to the copper extraction circuit; while, the organic stream 34 from the copper stripping stages may be sent directly to the nickel extraction stage. The organic stream flowing directly from copper stripping to nickel extraction is not shown in the drawing. In this hypothetical case, the organic mix tank is not required. In most cases, however, the organic feed rate to nickel extraction is greater than to copper extraction. Therefore, the embodiment of the invention shown in FIG. 5 is advantageously practiced by recycling the largest stream 24 of nickel stripped organic to the copper extraction circuit, the amount of which is equal to the total feed rate required for copper extraction. Organic existing copper stripping (stream 34) must normally be mixed with a bleed of the organic exiting nickel stripping (stream 40) in order to have an adequate feed rate for nickel extraction.

Figure 4:
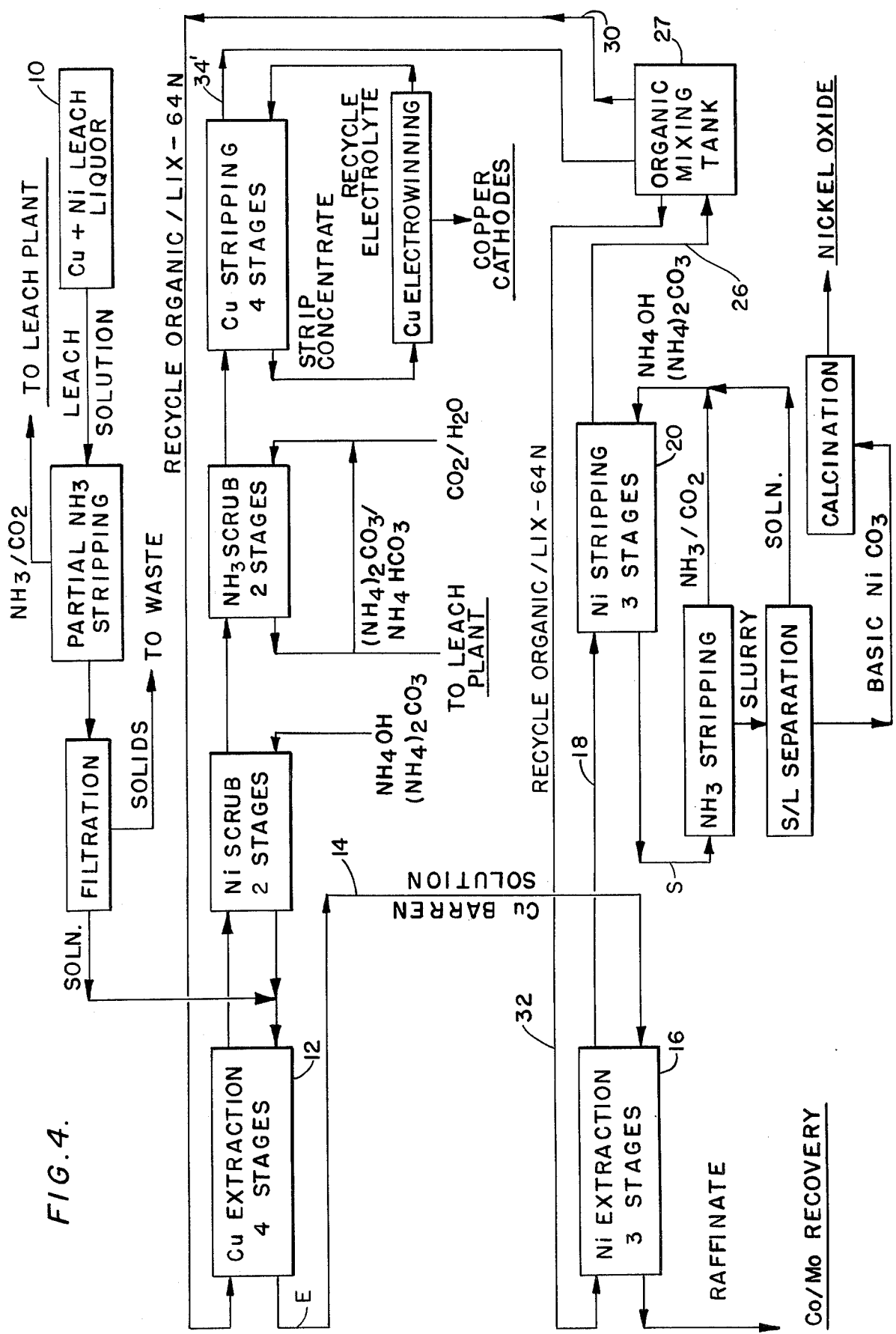
FIG. 4 is a more detailed flow sheet of one of the embodiments shown schematically in FIG. 3, and, FIG. 5 is a more detailed flow sheet of the other alternate embodiment of the present invention shown schematically in FIG. 3.

In an alternate embodiment of the invention as is shown in FIG. 4 and by the dotted lines in FIG. 3, the organic stream leaving nickel stripping stage 20 is delivered to a mix tank 27 as stream 26 where it is mixed with organic stream 34' leaving the copper stripping circuit. Streams 26 and 34' are mixed in the organic mix tank 27. The mixed organic is then delivered from the organic mix tank 27 to the copper extraction circuit as organic recycled stream 30 and to the nickel extraction circuit as organic recycle stream 32.

Both of these alternate embodiments of the present invention are expanded in examples which follow.

The reason why the foregoing recycle is acceptable is that the nickel on the organic is replaced by copper from the aqueous when the organic is in the copper extraction circuit in accordance with the following equation:

Thus, nickel does not build up on the organic in the copper extraction circuit. Furthermore, copper does not build up on the organic in the nickel extraction circuit because it is recycled back to the copper extraction circuit and subsequently stripped prior to re-entering the nickel extraction circuit.

Suitable organic extractants which can be employed in the present invention to extract copper values in stage 12 and nickel values in stage 16 include oximes. The oximes referred to herein may be for example α-hydroxy oximes, substituted hydroxy benzophenoximes, and mixtures thereof.

The α-hydroxy oxime component has the general formula:

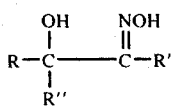

where R, R' and R'' may be any of a variety of organic hydrocarbon radicals such as aliphatic and alkylaryl radicals. R'' may also be hydrogen. Preferably, R and R' are unsaturated hydrocarbons or branched chain alkyl groups, containing from about 6 to 20 carbon atoms, R and R' are also preferably the same and, when alkyl, are preferably attached to the carbons substituted with the —OH and =NOH groups through a secondary carbon atom. It is also preferred that R'' is hydrogen or unsaturated hydrocarbon or branched chain alkyl groups containing from about 6 to 20 carbon atoms. The α-hydroxy oximes also preferably contain a total of about 14 to 40 carbon atoms. Representative compounds are 19-hydroxyhexatriaconta-9, 27-dien-18-oxime, 5–10-diethyl-8 hydroxy-tetradecan-7-oxime, and 5,8-diethyl-7-hydroxy-dodecane-6-oxime. The latter compound has the following structural formula:

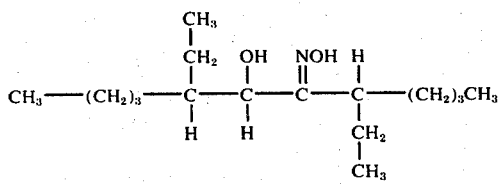

Representative of other mono- and polyunsaturated radicals are heptenyl, octenyl, decenyl, octadecenyl, and alkyl substituted radicals such as ethyloctadecenyl. Representative of other mono- and polyalkyl substituted saturated radicals are ethylhexyl, diethylheptyl, butyldecyl, butylhexadecyl, ethylbutyldodecyl, butylcyclohexyl and the like.

The α-hydroxy oxime component is also characterized as having a solubility of at least 2% by weight in the hydrocarbon solvent used to make up the organic phase and substantially complete insolubility in water.

The α-hydroxy oximes are prepared by reacting an acyloin with a hydroxylamine salt under reflux conditions. Such reaction can be carried out by refluxing the reactants in an alcohol such as ethanol and adding pyridine to combine with the acid associated with the hydroxylamine.

The substituted benzophenoximes useful in the present invention have the following formula:

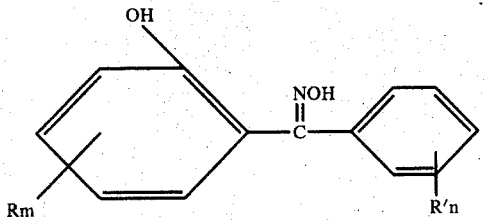

in which R and R' may be individually alike or different and are saturated aliphatic groups, ethylenically unsaturated aliphatic groups or saturated or ethylenically unsaturated aliphatic ether groups (i.e. — OR'') and $m$ and $n$ are 0, 1, 2, 3 or 4 with the proviso that $m$ and $n$ are not both 0. The total number of carbon atoms in $R_m$ and $R'_n$ is from 3–24. R and R' contain 1 to 25 carbon atoms when saturated aliphatic and 3 to 25 carbon atoms when they are ethylenically unsaturated groups. Preferably, the position ortho to the phenolic OH substituted carbon atom is unsubstituted and also preferably the positions ortho to the oxime carbon atom on the other aromatic nucleus are unsubstituted. Branched chain saturated aliphatic hydrocarbon substituents are preferred. Compounds of the above type useful in the present invention include the following:

2-hydroxy-3'methyl-5-ethylbenzophenoxime
2-hydroxy-5-(1,1-dimethylpropyl)-benzophenoxime
2-hydroxy-5-(1,1-dimethylethyl)-benzophenoxime
2-hydroxy-5-octylbenzophenoxime
2-hydroxy-5-nonyl-benzophenoxime
2-hydroxy-5-dodecyl-benzophenoxime
2-hydroxy-2', 4'-dimethyl-5-octylbenzophenoxime
2-hydroxy-2',3',5'-trimethyl-5-octylbenzophenoxime
2-hydroxy-3,5-dinonylbenzophenoxime
2-hydroxy-4'-(1,1-dimethylethyl)-5-(2-pentyl)-benzophenoxime
2-hydroxy-4'-(1,1-dimethylethyl)-5-(2-butyl)-benzophenoxime
2-hydroxy-4-dodecyloxybenzophenoxime
2-hydroxy-4'-(1,1-dimethylethyl)-(5-methyl)-benzophenoxime
2-hydroxy-4',5-bis-(1,1-dimethylethyl)-benzophenoxime It has been found that when the α-hydroxy aliphatic oximes are employed in combination with the 2-hydroxy benzophenoximes described, the extractions are improved. The relative amounts of the two extractants in the compositions of the present invention can be varied widely as examples hereinafter will demonstrate. Even minute quantities of the α-hydroxy aliphatic oxime are beneficial. However, it is preferred to employ it in the range of 1 to 100% by weight based on the weight of the 2-hydroxy benzophenoxime, with best results obtainable in the range of 15–50%. The amount of the extractants in the organic solvent likewise can vary within considerable limits. In general however, the concentration of total oxime is in the range 2–25%, based on the weight of the organic extracting solution, preferably in the range of 5–15%.

These and other suitable oximes are disclosed for example by U.S. Pat. Nos. 3,224,873, 3,592,775, 3,455,680, 3,428,499, 3,276,863 and 3,197,274. Particularly suitable extractants comprise 2-hydroxy-4-nonyl-benzophenoxime which is the primary extractant in a composition also containing an α-hydroxy oxime sold by General Mills, Inc. under the trade name LIX-64N; 5,8-diethyl-7-hydroxy-6-dodecanone oxime which is the primary extractant in a composition sold by General Mills, Inc. under the trade name LIX-63; and 2-hydroxy-4-dodecyl-benzophenoxime which is the primary extractant in a composition also containing an α-hydroxy oxime sold by General Mills, Inc. under the trade name LIX-64.

At this point, it should be noted that in addition to oximes other extractants are useable in the process of the present invention. The important characteristic that the extractant must possess in order to be useable in the present process is that it be selective for copper values under the conditions used to extract copper in stage 12 and also extract nickel values from the raffinate in state 16. It is preferred to use the same extractant in the copper extraction circuit that is used in the nickel extraction circuit. Other extractants which can be used in practicing the present invention include Kelex 100 and Kelex 120. Kelex is an Ashland Chemical Company trade name for an extractant which is a β-alkenyl substituted 8-hydroxyquinoline of the general formula:

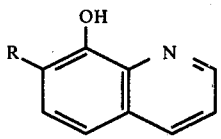

where R may be an alkenyl group.

There are many processes for leaching base metals such as copper and nickel with ammoniacal leach liquors. An example of such a process is the so called, "Cuprion Process" which is disclosed in U.S. Pat. application Ser. No. 311,063 (now abandoned in favor of application Ser. No. 548,430) entitled "Recovery of Metal Values from Manganese Deep Sea Nodules," filed Dec. 1, 1972, the teachings of which are incorporated herein by reference.

Ocean floor deposits are found as nodules, looselying at the surface of the soft sea floor sediment, as grains in the sea floor sediments, as crusts on ocean floor hard rock outcrops, as replacement fillings in calcareous debris and animal remains, and in other less important forms. Samples of this ore material can readily be recovered on the ocean floor by drag dredging, a method used by oceanographers for many years, or by deep sea hydraulic dredging, a method that could be used in commercial operations to mine these deposits. Mechanical deep sea nodule harvesters are described in U.S. Pat. Nos. 3,480,326 and 3,504,943.

The character and chemical content of the deep sea nodules may vary widely depending upon the region from which the nodules are obtained. The Mineral Resources of the Sea, John L. Mero, Elsevier Oceanography Series, Elsevier Publishing Company, 1965, discusses on pages 127–241 various aspects of manganese nodules. For a detailed chemical analysis of nodules from the Pacific Ocean see pages 449–450 in The Encyclopedia of Oceanography, edited by R. W. Fairbridge, Reinhold Publishing Corp., N.Y. 1966, and U.S. Pat. No. 3,169,856. For the purposes of this invention the complex ores will be considered as containing the following approximate metal content range on a dry basis:

| METAL CONTENT ANALYSIS RANGE | |
|---|---|
| Copper | 0.8 – 1.8% |
| Nickel | 1.0 – 2.0% |
| Cobalt | 0.1 – 0.5% |
| Molybdenum | 0.03 – 0.1% |
| Manganese | 10.0 – 40.0% |
| Iron | 4.0 – 25.0% |

The remainder of the ore consists of oxygen as oxides, clay minerals with lesser amounts of quartz, apatite, biotite, sodium and potassium feldspars and water of hydration. Of the many ingredients making up the manganese nodules, copper and nickel are emphasized because, from an economic standpoint, they are the most significant metals in most of the ocean floor ores.

Copper, nickel, cobalt and molybdenum are recovered from raw manganese nodules with an aqueous ammoniacal leach solution containing cuprous ions. The "Cuprion Process" as disclosed in application Ser. No. 311,063 includes the step of contacting ground manganese nodules with an ammoniacal leach solution containing cuprous ions in a reaction vessel to reduce the manganese oxides in the nodules to enable metal values such as copper, nickel, cobalt and molybdenum to be solubliized. The nodule residue is washed with an ammoniacal ammonium carbonate solution to remove these entrained metal values from the residue and produce a pregnant liquor.

The pregnant liquor contains various metal values including copper, nickel, cobalt and molybdenum which can be recovered. One important application for the process of the present invention is in recovering metal values leached from manganese nodules in accordance with the cuprion process. In accordance with the present invention, there are several alternative methods for recovering metals from the pregnant liquor. Two of these alternative embodiments are shown separately in FIGS. 4 and 5.

Referring specifically to FIG. 4, an ammoniacal leach liquor or solution 10 having an initial pH greater than 10 is steam stripped to remove ammonia in sufficient quantities to bring the pH of the leach liquor 10 to a value of about 9.8. Nodule leach solution received from the leach/wash circuit of the Cuprion process typically contains about 100 g/l total $NH_3$. Prior to entering the nickel extraction circuit, the total $NH_3$ content of the leach solution is lowered to 30 g/l. Ammonia removal can be before the copper extraction but must be before the nickel extraction. Application of the ammoniacal stripping process requires, therefore, that a substantial portion (60–70%) of the ammonia be removed from the leach solution prior to nickel extraction. The metal values in leach liquor 10 range between approximately 3–8 grams per liter copper and 3–10 grams per liter nickel. Other metal values such as cobalt and molybdenum are also present in leach liquor 10; however, in the extraction scheme of the present invention, cobalt and molybdenum remain in the raffinate leaving nickel extraction stage 16. These values are recoverable in accordance with procedures that do not constitute part of the present invention. Leach liquor 10 also has a carbon dioxide concentration of 25 grams per liter.

In extraction stage 12, the leach liquor is contacted countercurrently in four mixer-settler units to extract copper. LIX-64N in a kerosene base can be advantageously employed as the organic extractant for both copper and nickel extraction. After being scrubbed to remove nickel, the copper loaded organic is stripped. Copper may be advantageously recovered from the strip concentrate by electrowinning. At this point, it should be noted that the details of copper extraction, nickel scrubbing, copper stripping and copper electrowinning are all part of the prior art.

The organic extractant 34' leaving the copper stripping stages is delivered to an organic mix tank 27 where it is mixed with organic stream 26 from the nickel stripping circuit. The streams 26 and 34' are mixed in organic mix tank 27 and are delivered at the desired flow rates as streams 30 and 32 to the copper extraction stage and nickel extraction stage.

The embodiment of the invention that is shown in FIG. 5 is similar to the embodiment shown in FIG. 4.

The major difference however, is that the organic stream 22 leaving the nickel stripping circuit can be flowed directly into the copper extraction circuit as stream 24 without being mixed with organic stream 34 from the copper stripping circuit. However, as is shown in FIG. 5, a portion of the organic stream 22 leaving the nickel stripping circuit can be diverted to a mix tank 42 as stream 40 where it is mixed with organic stream 34 leaving the copper stripping circuit. As has been stated above, all flow rates depend on the amount of $Cu^{++}$ and $Ni^{++}$ in the leach solution.

As is also stated above, it is preferred to strip the nickel from the organic with a highly concentrated ammonium salt. Preferably, the nickel is stripped with a solution including ammonium carbonate. In this case, the stripped nickel comprises nickel carbonate which can be converted to a usable nickel oxide or reduced to usable nickel powder. In this type of stripping, a recirculating aqueous phase containing the ammonium salt contacts the nickel loaded organic phase thereby precipitating basic nickel carbonate. The nickel precipitate and the aqueous phase are fed to a solids/liquids separator to recover the aqueous phase for recirculation and to produce nickel oxide which is usable directly or processable in high temperature reduction equipment to produce nickel powder. Alternatively, the nickel carbonate slurried in an aqueous carrier, can be pressure reduced and passed through a solids/liquids separator to produce nickel powder.

The practice of the invention is further illustrated by the following non-limiting examples.

EXAMPLE 1

Nickel loaded 40 volume % LIX-64N was prepared by contacting fresh organic twice with a solution containing 8 g/l Ni, 30 g/l $NH_3$ and 25 g/l $CO_2$. An O/A ratio of 1.0 was used. The loaded organic analyzed 10.5 g/l Ni. A 100 ml portion of the organic was then stripped with 50 ml of aqueous solution analyzing 150 g/l $NH_3$ and 88 g/l $CO_2$. The contact time was 6 minutes. The obtained strip concentrate contained 11.5 g/l Ni. Nickel can be recovered from the latter solution by conventional methods. The stripped organic contained 4.46 g/l Ni. After stripping, the organic can be recycled and reloaded to a level of 10.5 g/l Ni.

EXAMPLE 2

A series of stripping tests were carried out at various O/A ratios using an organic feed (40 volume % LIX-64N) containing 10.5 g/l Ni. The aqueous strip solution contained 150 g/l $NH_3$ and 88 g/l $CO_2$. The strip tests were made at ambient temperature using a contact time of 6 minutes. The obtained strip equilibrium data is given in Table I below. Stripping of Ni from 9.5 g/l to less than 3 g/l can be achieved in 3 stages, yielding a strip concentrate containing 20 g/l Ni.

TABLE I

Strip Solution: 150 g/l $NH_3$ (total), 88 g/l $CO_2$
Organic Feed: 40 v/v % LIX-64N containing 10.5 g/l nickel

| O/A Ratio | g/l Nickel | | % Stripped |
|---|---|---|---|
| | Organic | Aqueous | |
| 20 | 0.89 | 0.453 | 91.5 |
| 10 | 1.58 | 0.889 | 85.0 |
| 3 | 2.34 | 2.62 | 77.7 |
| 1 | 3.66 | 6.77 | 65.1 |
| 0.5 | 4.46 | 11.5 | 57.5 |
| 0.25 | 5.48 | 19.8 | 47.8 |

TABLE I-continued

Strip Solution: 150 g/l $NH_3$ (total), 88 g/l $CO_2$
Organic Feed: 40 v/v % LIX-64N containing 10.5 g/l nickel

| O/A Ratio | g/l Nickel | | % Stripped |
|---|---|---|---|
| | Organic | Aqueous | |
| 0.1 | 7.45 | 29.8 | 29.0 |

EXAMPLE 3

The system of FIG. 4 was run with four copper extraction stages, two nickel scrub stages, two ammonia scrub stages, two nickel extraction stages and three nickel strip stages. The leach liquor 10 has the following composition:
5.1 g/l Cu
5.9 g/l Ni
0.2 g/l Co
0.15 g/l Zn
0.5 g/l Mo
≈ 33 g/l $NH_3$
≈ 33 g/l $CO_2$
pH≈9.7

Organic streams leaving the copper stripping circuit and nickel stripping circuit were mixed in a mix tank and pumped into the copper extraction circuit and nickel extraction circuit at different flow rates. The copper strip solution had the following composition:
34.5 g/l Cu
~166 g/l $H_2SO_4$
~10 g/l Ni The nickel strip solution had the following composition:
~150 g/l $NH_3$
~88 g/l $CO_2$ During running, copper and nickel samples were taken every hour [after running initially for 1½ hours to adjust levels and flow rates]. The flow rates were adjusted to:
Cu extraction-organic: 32 ml/min
Ni extraction-organic: 68 ml/min
leach solution: 68 ml/min
nickel scrub: 64 ml/min
nickel scrub recycle: 62 ml/min
$NH_3$ scrub: 8 ml/min
$NH_3$ scrub recycle: 60 ml/min
copper strip: 34 ml/min
copper strip recycle: 34 ml/min
nickel strip: 20.4 ml/min
nickel strip recycle: 12 ml/min The results of hourly sample and analysis were as shown in Table II where S indicates the first stage of nickel strip and E indicates the last stage of copper extraction. All values given for copper and nickel pertain to the aqueous phase. The letters S and E in FIG. 4 show where each sample point was located in the flow scheme.

TABLE II

| Hour | Place | g/l Cu | g/l Ni |
|---|---|---|---|
| 1 | S | 0.0149 | 13.2 |
| 1 | E | 0.0469 | 6.18 |
| 2 | S | 0.0148 | 16.6 |
| 2 | E | 0.0429 | 6.41 |
| 3 | S | 0.0167 | 19.1 |
| 3 | E | 0.424 | 6.51 |
| 4 | S | 0.0185 | 18.8 |
| 4 | E | 0.0453 | 6.48 |
| 5 | S | 0.0195 | 18.6 |

TABLE II-continued

| Hour | Place | g/l Cu | g/l Ni |
|------|-------|--------|--------|
| 5 | E | 0.0522 | 6.47 |
| 6 | S | 0.0217 | 18.6 |
| 6 | E | 0.0520 | 6.43 |
| 7 | S | 0.0222 | 18.2 |
| 7 | E | 0.0492 | 6.39 |
| 8 | S | 0.0230 | 18.15 |
| 8 | E | 0.0749 | 6.45 | ous phases, together with cobalt and zinc data for the organic phase, is given in Table IV in g/l. The Co, Zn and Pb are trace impurities in the leach liquor used. They were analyzed for in the different streams in order to monitor their buildup in the nickel strip concentrate. This gives some idea of the purity to be expected in the final nickel product.

Table III

| Hour | Stream | g/l Cu | g/l Ni | g/l Co | g/l Zn |
|------|--------|--------|--------|--------|--------|
| 1 | Copper barren leach solution | 0.016 | 5.46 | | |
| 1 | Raffinate | | 0.005 | | |
| 1 | Nickel strip concentrate | 0.024 | 13.8 | .011 | .040 |
| 2 | Copper barren leach solution | 0.016 | 6.00 | | |
| 2 | Raffinate | | 0.006 | | |
| 2 | Nickel strip concentrate | 0.019 | 16.9 | .013 | .033 |
| 3 | Copper barren leach solution | 0.019 | 5.96 | | |
| 3 | Raffinate | | 0.008 | | |
| 3 | Nickel strip concentrate | 0.026 | 16.2 | 0.13 | .022 |
| 4 | Copper barren leach solution | 0.019 | 6.00 | | |
| 4 | Raffinate | | 0.008 | | |
| 4 | Nickel strip concentrate | 0.026 | 17.5 | .013 | .023 |
| 5 | Copper barren leach solution | 0.016 | 5.95 | | |
| 5 | Raffinate | | 0.007 | | |
| 5 | Nickel strip concentrate | 0.026 | 17.8 | .014 | .023 |
| 6 | Copper barren leach solution | 0.019 | 6.00 | | |
| 6 | Raffinate | | 0.007 | | |
| 6 | Nickel strip concentrate | 0.023 | 17.5 | .014 | .027 |
| 7 | Copper barren leach solution | 0.023 | 6.12 | | |
| 7 | Raffinate | 0.001 | 0.008 | | |
| 7 | Nickel strip concentrate | 0.021 | 18.4 | .015 | .027 |
| 8 | Copper barren leach solution | 0.024 | 6.05 | | |
| 8 | Raffinate | 0.001 | 0.008 | | |
| 8 | Nickel strip concentrate | 0.021 | 18.8 | .016 | .026 |
| 9 | Copper barren leach solution | 0.024 | 6.01 | | |
| 9 | Raffinate | 0.001 | 0.008 | | |
| 9 | Nickel strip concentrate | 0.021 | 18.4 | .015 | .027 |

*Pb content of Ni strip concentrate was less than .001 g/l in all samples.

Table IV

| | Organic | | | | Aqueous | |
|---|---|---|---|---|---|---|
| | g/l Ni | g/l Cu | g/l Co | g/l Zn | g/l Ni | g/l Cu |
| 1st Ni Ext. Stage | 8.64 | 0.786 | 0.0074 | 0.0044 | 1.13 | 0.0005 |
| 2nd Ni Ext. Stage | 3.98 | 0.758 | | | 0.105 | 0.0006 |
| 3rd Ni Ext. Stage | 2.53 | 0.762 | | | 0.0085 | 0.0006 |
| 1st Ni Strip Stage | 6.26 | 0.782 | 0.0053 | 0.0022 | 18.49 | 0.0219 |
| 2nd Ni Strip Stage | 4.68 | 0.782 | | | 11.14 | 0.0298 |
| 3rd Ni Strip Stage | 3.29 | 0.776 | 0.0049 | 0.0018 | 4.85 | 0.0262 |

EXAMPLE 4

A continuous run repeat of Example 3 was made in which a third nickel extraction stage was added, the leach solution contained 4.98 g/l Cu and 5.9 g/l Ni and a copper strip solution containing 159 g/l free $H_2SO_4$ was used. All other conditions and flow rates were the same as indicated for Example 3.

The entire circuit was operated for 1.2 hours in order to adjust levels and obtain steady state. At the end of this short run, a sample of the raffinate from the nickel extraction circuit was taken to serve as the start of subsequent hourly analysis and was found to contain 0.0036 g/l of nickel.

During the run, hourly samples of this raffinate, nickel strip concentrate, and copper barren leach solution were taken for immediate analysis of nickel and copper. Later, hourly samples of organic feed and copper strip concentrate were also taken and the results are shown in Table III. Cells (each stage of the nickel extraction and nickel strip apparatus) were sampled at the end of the run (i.e. approximately hour 10); and, the copper and nickel content of the organic and aque- The foregoing data indicates where copper buildup in the organic reaches equilibrium, and the amount of copper expected to strip in the nickel strip stage.

EXAMPLE 5

The following description is a more detailed description of the process represented by FIG. 4. This description, however, should not be interpreted as being suggestive of an optimum process design. The description simply represents one set of conditions at which adequate metals separation and recovery can be achieved.

As shown in FIG. 4, the process for treating manganese nodule leach liquors consists of two principal circuits, a copper circuit and a nickel circuit. The copper circuit includes four extraction stages 12, two nickel scrub stages, two ammonia scrub stages, and four copper strip stages. The nickel circuit consists of three extraction stages 16 and three strip stages 20. The organic extractant used is 40 volume % LIX-64N in kerosene (Napoleum 470). Stripped organic exiting the two circuits is introduced to a common holding tank 27 where continuous mixing is applied to provide organic feed of uniform composition. The temperature is maintained at 40° C throughout the process. The contact time is two minutes in each stage.

Nodule leach solution 10, typically containing about 5 g/l copper and 6 g/l nickel, is subjected to steam stripping to lower its ammonia concentration to approximately 30 g/l. The stripping step may also serve to precipitate a portion of the contained manganese, in which case subsequent filtration of the leach solution is required. After filtration, the leach liquor is admixed with aqueous effluent from the nickel scrub circuit, yielding feed solution assaying 5.75 g/l nickel and 4.7 g/l copper. The aqueous solution enters the first copper extraction stage, and flows counter-currently with the recycled organic extractant which is introduced to the fourth extraction stage. The organic feed 30 contains typically 0.75 g/l copper and 2.5 g/l nickel. The extraction of copper results in transfer of nickel to the aqueous phase according to the exchange reaction:

$$R_2Ni + Cu^{++} \longrightarrow R_2Cu + Ni^{++}$$

The extraction of copper yields a copper-barren solution 14 containing 6.5 g/l nickel and 0.05 g/l copper. This solution is transferred to the nickel circuit.

The copper extraction circuit is operated at an O/A ratio of 0.43, thus producing copper-loaded organic containing 11.6 g/l copper. In addition to copper, however, the organic also contains about 0.7 g/l nickel. Removal and recovery of the major portion of nickel from the organic is the function of the nickel scrub circuit. The circuit consists of two stages and is operated counter-currently at an external O/A ratio of 5.0. A solution containing 100 g/l ammonia and 25 g/l carbon dioxide is used as scrub solution. The scrubbing typically effects removal of copper and nickel from the organic to levels of about 11.3 and 0.08 g/l, respectively. The aqueous effluent from the circuit, which contains 3 g/l nickel and 1.5 g/l copper, is admixed with leach solution entering the copper extraction circuit.

In addition to copper and a minor amount of nickel, the loaded organic leaving the second nickel scrub stage also contains approximately 1 g/l ammonia. Removal of the major portion of ammonia from the organic is required to maintain losses at a minimum, and also to avoid excessive build-up of ammonia in the copper strip circuit. Selective removal and recovery of ammonia is achieved in the ammonia scrub circuit. The circuit consists of two stages, and is operated counter-currently at an external O/A ratio of 10.0. A one molar solution of ammonium bicarbonate is used as scrub feed solution. The scrubbing results in conversion of the bicarbonate to carbonate according to the reaction:

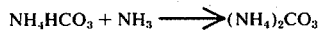
$$NH_4HCO_3 + NH_3 \longrightarrow (NH_4)_2CO_3$$

A portion of the scrub effluent leaving the first scrub stage is bled off and recycled to the ammonia recovery plant. The rest of the solution is recycled to the scrub circuit after treatment with carbon dioxide to regenerate ammonium bicarbonate. The scrub circuit decreases the ammonia content of the organic from 1 g/l to less than 0.08 g/l. The losses of copper and nickel are negligible.

The copper-loaded organic leaving the ammonia scrub circuit is introduced to the first of four copper strip stages. Recycle electrolyte from the copper electrowinning plant, containing 35 g/l copper and 165 g/l sulfuric acid, is used as strip feed solution. The circuit is operated at an external O/A ratio of 0.94. The copper strip concentrate leaving the first strip stage contains 45 g/l copper and 150 g/l sulfuric acid. The concentrate is transferred to the copper electrowinning plant for recovery of metallic copper in the form of cathodes, and regeneration of strip feed solution. The stripped organic 34 which contains about 0.65 g/l copper and essentially no nickel, is transferred to a continuously agitated holding tank 27. In this tank, the stripped organic is mixed with organic 26 from the nickel strip circuit, and then used as organic feed in the respective extraction circuits.

As indicated above, the copper-barren solution from the copper circuit contains 6.5 g/l nickel and about 0.05 g/l copper. This solution enters the first stage of the nickel extraction circuit, and flows counter-currently with the organic extractant which is introduced to the third extraction stage. The circuit consists of three stages, and is operated at an external O/A ratio of 1.0. The extraction of nickel yields raffinate assaying less than 0.01 g/l nickel and 0.001 g/l copper. The raffinate can be further processed to recover cobalt and molybdenum.

The organic 18 leaving the first stage of the nickel extraction circuit, containing 9 g/l nickel and 0.8 g/l copper, is transferred and introduced to the first stage of the nickel strip circuit. A solution of 150 g/l ammonia and 88 g/l carbon dioxide is used as strip feed solution. The nickel strip circuit consists of three stages and is operated at an external O/A ratio of 3.35. The nickel strip concentrate leaving the first strip stage contains about 20 g/l nickel and only 0.02 g/l copper. The concentrate is subjected to steam stripping for removal of ammonia and carbon dioxide, thereby precipitating nickel in the form of basic carbonate. After filtration, the carbonate is converted to nickel oxide by use of conventional methods. The filtrate from the nickel precipitation is recycled and used for make-up of strip feed solution. The stripped organic from the nickel circuit, assaying about 3.5 g/l nickel and 0.8 g/l copper, is transferred to the organic holding tank 27. The mixing of stripped organic from the copper and nickel circuits results in organic feed solution containing 2.5 g/l nickel and 0.75 g/l copper which is fed back into the copper circuit and the nickel circuit as streams 30 and 32 respectively.

CONCLUSION

In the process of FIGS. 1 and 2, the copper entering the nickel circuit builds up in the organic phase to a level where an equal amount of copper is stripped and removed as a nickel product contaminant. Also, operating the nickel circuit with a high copper level in the organic phase adversely affects the nickel extraction efficiency as well as the nickel loading capacity of the organic. Thus, the process of FIGS. 1 and 2 is not attractive unless a very low copper level in the "copper barren solution" is maintained.

In accordance with the present invention, it has been demonstrated that a nickel loaded organic can be recycled to the copper circuit and used as a copper extractant according to the overall exchange reaction.

By utilizing the above reaction, the process can be operated in accordance with FIGS. 4 or 5, thereby maintaining the copper level in the organic entering the nickel circuit at an acceptably low level. By material balance, the copper concentration of the organic entering the nickel circuit is given by

[Cu] = y + KA/B, where
y = copper concentration of organic from Cu strip circuit.
K = g/l pick-up of Cu per organic cycle in nickel circuit.
A = organic flow rate in nickel circuit.
B = organic flow rate in copper circuit.

For nodule leach solution, typical values of y, K and A/B would be 0.6 g/l, 0.1 g/l and 2.125. These values correspond to a steady-state concentration of Cu of 0.8125 g/l.

The principle of copper purification utilized in the process for FIGS. 4 and 5 also applies to other impurities (Co, Zn) which tend to build up in the organic phase. Also, the process serves to lower the nickel concentration in the organic feed to the nickel circuit, thereby increasing the nickel extraction efficiency.

Maximum utilization of the purification principle described above is illustrated in FIG. 5. Operating the process with maximum organic recycle to the copper circuit results in a steady-state copper concentration [Cu] given by:

[Cu] = y + K A/B - K

For the values of y, K and A/B given above, a copper concentration of 0.7125 is obtained.

For systems requiring higher organic flow in the copper circuit than in the nickel circuit, all the organic from the latter circuit is recycled to the copper circuit. For this case [Cu] becomes equal to y. Furthermore, the organic feed to the nickel circuit will be essentially free of nickel.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A process for treating an ammoniacal leach liquor containing copper and nickel to separate the copper and nickel from the leach liquor and each other comprising the following steps:
   a. contacting the leach liquor with an organic extractant in a copper extraction circuit to extract copper and produce a copper loaded organic;
   b. contacting the copper depleted leach liquor of step (a) with an organic extractant in a nickel extraction circuit to extract nickel and produce a nickel loaded organic;
   c. stripping the nickel loaded organic extractant of step (b);
   d. recycling at least a portion of the organic stripped in step (c) containing unstripped nickel back to the copper extraction circuit, in the copper extraction circuit said unstripped nickel on the oganic being replaced by copper from the aqueous, said recycling step preventing the build up of copper on the organic in the nickel extraction circuit.

2. The process as set forth in claim 1 wherein the nickel is stripped in step (c) with a highly concentrated ammonium salt solution to yield a strip concentrate from which nickel or nickel oxide is recoverable without electrolytic treatment.

3. The process as set forth in claim 1 wherein the copper loaded organic extractant produced in step (a) is stripped of copper values to enable the copper to be recovered and wherein a portion of the organic extractant stripped of copper values is recycled to the nickel extraction circuit of step (b) to extract nickel.

4. A method for preventing build up of copper on an organic oxime extractant used to extract nickel in a nickel extraction circuit after copper is extracted in a copper extraction circuit from an ammoniacal leach solution containing copper and nickel and in which the nickel is stripped from the organic with a highly concentrated ammonium salt solution in a nickel stripping circuit comprising the following steps:
   a. recycling at least a portion of the organic leaving the nickel stripping circuit back to the copper extraction circuit;
   b. extracting copper in the copper extraction circuit with the recycled organic from the nickel stripping circuit, nickel on said recycled organic being replaced by copper from the aqueous in accordance with the equation:

where R represents the organic moiety of the extractant and o and a represent the organic and aqueous phase, respectfully.

5. A process for recovering copper and nickel from an aqueous ammoniacal leach liquor containing copper and nickel comprising the following steps:
   a. first extracting copper from the leach liquor in a copper extraction circuit with an organic extractant to leave a raffinate that is depleted in copper values and high in nickel values;
   b. thereafter extracting nickel from the raffinate of step (a) in a nickel extraction circuit;
   c. separately stripping the copper loaded organic produced in step (a) in a copper stripping circuit and the nickel loaded organic produced in step (b) in a nickel stripping circuit.
   d. thereafter introducing the stripped organic from the copper stripping circuit and the stripped organic from the nickel stripping circuit into a mix tank;
   e. mixing the organics from the copper and nickel stripping circuits in the mix tank; and,
   f. recycling a portion of the organic mixed in step (e) to the copper extraction circuit and recycling a portion of the organic mixed in step (e) to the nickel extraction circuit.

6. A process for treating an ammoniacal leach liquor containing copper, nickel, cobalt and molybdenum values in which the ammonia content of the ammoniacal leach liquor is reduced to a level of 30 g/l or less prior to extracting nickel comprising the steps of:

a. contacting the leach solution with an organic oxime to selectively extract copper from the leach solution;

b. stripping copper from the copper loaded organic oxime of step (a) with an acid;

c. subjecting the copper electrolyte produced in step (b) to electrowinning for the recovery of copper in the form of cathodes;

d. contacting the copper depleted leach solution of step (a) which has an ammonia content of 30 g/l or less with an organic oxime to extract nickel;

e. contacting the nickel loaded organic oxime produced in step (d) with a highly concentrated ammonium carbonate salt solution to strip a portion of the nickel loaded on the organic oxime;

f. stripping ammonia from the strip solution of step (e) to precipitate nickel contained in the strip solution as a basic carbonate;

g. recovering nickel from the precipitated carbonate of step (f);

h. recycling the nickel stripped organic oxime of step (e) to step (a), to extract copper, the recycling of the nickel stripped organic oxime to the copper extraction circuit of step (a) preventing the build-up of copper in the organic oxime used for nickel extraction; and, recycling the organic stripped of copper in step (b) to step (d) to be used in extracting nickel.

7. The process as set forth in claim 6 wherein in step (b) the copper loaded organic oxime is stripped with sulfuric acid.

8. The process as set forth in claim 6 wherein in step (e) the nickel loaded organic oxime is contacted with a solution containing approximately 150 g/l ammonia and 90 g/l $CO_2$ to strip a portion of the nickel loaded on the organic oxime.

9. The process as set forth in claim 6 wherein in step (g) the carbonate is calcined to form nickel oxide.

10. The process as set forth in claim 6 wherein cobalt and molybdenum remain in the copper and nickel depleted raffinate.

* * * * *